United States Patent
Brosnan

(10) Patent No.: US 7,903,086 B2
(45) Date of Patent: Mar. 8, 2011

(54) APPARATUS FOR CONTROLLING A SCREEN POINTER THAT DISTINGUISHES BETWEEN AMBIENT LIGHT AND LIGHT FROM ITS LIGHT SOURCE

(75) Inventor: Michael J. Brosnan, Fremont, CA (US)

(73) Assignee: Avago Technologies ECBU IP (Singapore) Pte. Ltd., Singapore (SG)

(*) Notice: Subject to any disclaimer, the term of this patent is extended or adjusted under 35 U.S.C. 154(b) by 783 days.

(21) Appl. No.: 11/840,350

(22) Filed: Aug. 17, 2007

(65) Prior Publication Data

US 2007/0279384 A1 Dec. 6, 2007

Related U.S. Application Data

(62) Division of application No. 10/341,710, filed on Jan. 14, 2003, now Pat. No. 7,295,186.

(51) Int. Cl.
*G09G 5/08* (2006.01)
(52) U.S. Cl. ........................................ 345/166
(58) Field of Classification Search .......... 345/156–179; 178/18.01–18.09, 18.11, 19.01–19.06
See application file for complete search history.

(56) References Cited

U.S. PATENT DOCUMENTS

| 301,133 | A | 7/1884 | Lilley et al. |
|---|---|---|---|
| 4,128,760 | A | 12/1978 | Del Signore, II |
| 4,266,674 | A | 5/1981 | Bell et al. |
| 4,375,921 | A | 3/1983 | Morander |
| 4,682,015 | A | 7/1987 | Quan |
| 4,740,675 | A | 4/1988 | Brosnan et al. |
| 4,794,384 | A | 12/1988 | Jackson |
| 5,138,149 | A | 8/1992 | Cadet et al. |
| RE34,411 | E * | 10/1993 | Nishioka et al. ............... 348/70 |
| 5,578,813 | A | 11/1996 | Allen et al. |
| 5,644,139 | A | 7/1997 | Allen et al. |
| 5,666,037 | A * | 9/1997 | Reime ........................ 318/483 |
| 5,684,294 | A | 11/1997 | Kouhi |
| 5,786,804 | A | 7/1998 | Gordon |
| 5,793,353 | A | 8/1998 | Wu |
| 5,793,357 | A | 8/1998 | Ivey et al. |
| 5,963,199 | A | 10/1999 | Kato et al. |
| 5,994,710 | A | 11/1999 | Knee et al. |
| 6,057,540 | A | 5/2000 | Gordon et al. |
| 6,144,366 | A | 11/2000 | Numazaki et al. |
| 6,151,015 | A | 11/2000 | Badyal et al. |
| 6,281,882 | B1 | 8/2001 | Gordon et al. |
| 6,455,840 | B1 | 9/2002 | Oliver et al. |
| 6,816,150 | B2 | 11/2004 | Casebolt et al. |
| 6,831,628 | B1 | 12/2004 | Farag et al. |
| 6,950,094 | B2 | 9/2005 | Gordon et al. |

(Continued)

FOREIGN PATENT DOCUMENTS

EP 181612 5/1986

(Continued)

*Primary Examiner* — Stephen G Sherman

(57) ABSTRACT

An apparatus for controlling the position of a screen pointer for an electronic device having a display screen, includes a light source for illuminating an imaging surface with a plurality of light pulses, thereby generating reflected light pulses. A detection circuit is configured to sense light, distinguish between the reflected pulses and ambient light, and generate a low signal indication if the magnitude of the reflected pulses falls below a threshold value. An optical motion sensor generates digital images based on the reflected pulses. The motion sensor is configured to generate movement data based on the digital images. The movement data is indicative of relative motion between the imaging surface and the apparatus.

19 Claims, 4 Drawing Sheets

| U.S. PATENT DOCUMENTS | | |
|---|---|---|
| 2002/0061217 A1 | 5/2002 | Hillman et al. |
| 2002/0093487 A1 | 7/2002 | Rosenberg |
| 2003/0020688 A1 | 1/2003 | Norskog et al. |
| 2004/0217267 A1 | 11/2004 | Reime |

| FOREIGN PATENT DOCUMENTS | | |
|---|---|---|
| EP | 1096778 | 5/2001 |
| GB | 2206203 | 12/1988 |
| WO | WO-99/23479 | 5/1999 |

* cited by examiner

APPARATUS FOR CONTROLLING A SCREEN POINTER THAT DISTINGUISHES BETWEEN AMBIENT LIGHT AND LIGHT FROM ITS LIGHT SOURCE

CROSS REFERENCE TO RELATED APPLICATION

This application is a divisional application, which is based on and claims priority to U.S. patent application Ser. No. 10/341,710, filed on Jan. 14, 2003 now U.S. Pat. No. 7,295,186, and which is incorporated herein by reference in its entirety.

THE FIELD OF THE INVENTION

This invention relates generally to devices for controlling a pointer (cursor) on a display screen, and relates more particularly to an apparatus for controlling a screen pointer that distinguishes between ambient light and light from its light source.

BACKGROUND OF THE INVENTION

The use of a hand operated pointing device for use with a computer and its display has become almost universal. One form of the various types of pointing devices is the conventional (mechanical) mouse, used in conjunction with a cooperating mouse pad. Mechanical mice typically include a rubber-surfaced steel ball that rolls over the mouse pad as the mouse is moved. Interior to the mouse are rollers, or wheels, that contact the ball at its equator and convert its rotation into electrical signals representing orthogonal components of mouse motion. These electrical signals are coupled to a computer, where software responds to the signals to change by a $\Delta X$ and a $\Delta Y$ the displayed position of a pointer in accordance with movement of the mouse.

In addition to mechanical types of pointing devices, such as a conventional mechanical mouse, optical pointing devices have also been developed. In one form of an optical pointing device, rather than using a moving mechanical element like a ball, relative movement between an imaging surface, such as a finger or a desktop, and photo detectors within the optical pointing device, is optically sensed and converted into movement information. Battery operated optical mice are currently available based on Agilent's ADNS-2020 and ADNS-2030 optical image sensors. Other optical mice are available based on Agilent's ADNS-2001 and ADNS-2051, as well as other optical image sensors.

In a typical optical mouse, a light emitting diode (LED) illuminates the surface under the mouse. Under normal circumstances, the mouse body blocks ambient light from reaching the area of the navigation surface visible to the image sensor. However, when the mouse is lifted, ambient light can provide strong amplitude (but out of focus) images to the image sensor. It is desirable for the optical mouse sensor to report no motion in such situations, as the user is either finished with mouse usage (e.g., the mouse is set aside) or is attempting to reposition the screen pointer due to limited space on the navigation surface.

At present, optical mice use out-of-focus indications, low signal amplitude indications, or zero displacement answers from cross-correlation, in order to detect a mouse lifted condition and keep the screen pointer steady. For the out-of-focus technique, the pictures from the image array are typically passed through a high pass filter, and the output of the high pass filter provides an indication of whether the images are in focus or not. If the images are not in focus, it is likely that the surface under the mouse is not at the correct, normal distance, and the mouse may have been lifted by the user. For the low signal amplitude technique, the total amount of signal output by the image sensor, which could be comprised of both light bouncing off the surface from the LED and ambient light, is measured. When the amplitude of the signal out of the image sensor is low, an indication to stop moving the screen pointer is generated. If a sufficient amount of ambient light strikes the image sensor when the mouse is lifted, a low signal amplitude signal will not be generated, and the screen pointer may continue moving. For the third technique (zero displacement answers from cross-correlation), images are captured and correlated in the normal manner to determine how much motion has occurred. When the mouse is lifted, the captured images are typically blurry and appear to be essentially the same to the mouse, so the mouse typically, but not always, reports zero motion in this situation, causing the screen pointer to stop moving.

These prior methods for detecting a mouse lifted condition are not always reliable. In some cases, the screen pointer moves in an unpredictable path, or jitters in place, when it should remain still, which results in an annoyance to the user and an undesirable consumption of power. If the mouse lifted condition is not detected, the mouse may remain in a full power mode, rather than switching to a sleep mode. For a battery-operated mouse, if the mouse is left upside down or is left unused at the end of a desk for a long period of time, a large amount of battery power can be consumed by not detecting this condition and freezing the screen pointer.

In addition, if there is a large amount of ambient light on the area under the mouse that is being imaged, this ambient light can interfere with navigation accuracy during normal use of the mouse.

SUMMARY OF THE INVENTION

One form of the present invention provides an apparatus for controlling the position of a screen pointer for an electronic device having a display screen. The apparatus includes a light source for illuminating an imaging surface with a plurality of light pulses, thereby generating reflected light pulses. A detection circuit is configured to sense light, distinguish between the reflected pulses and ambient light, and generate a low signal indication if the magnitude of the reflected pulses falls below a threshold value. An optical motion sensor generates digital images based on the reflected pulses. The motion sensor is configured to generate movement data based on the digital images. The movement data is indicative of relative motion between the imaging surface and the apparatus.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
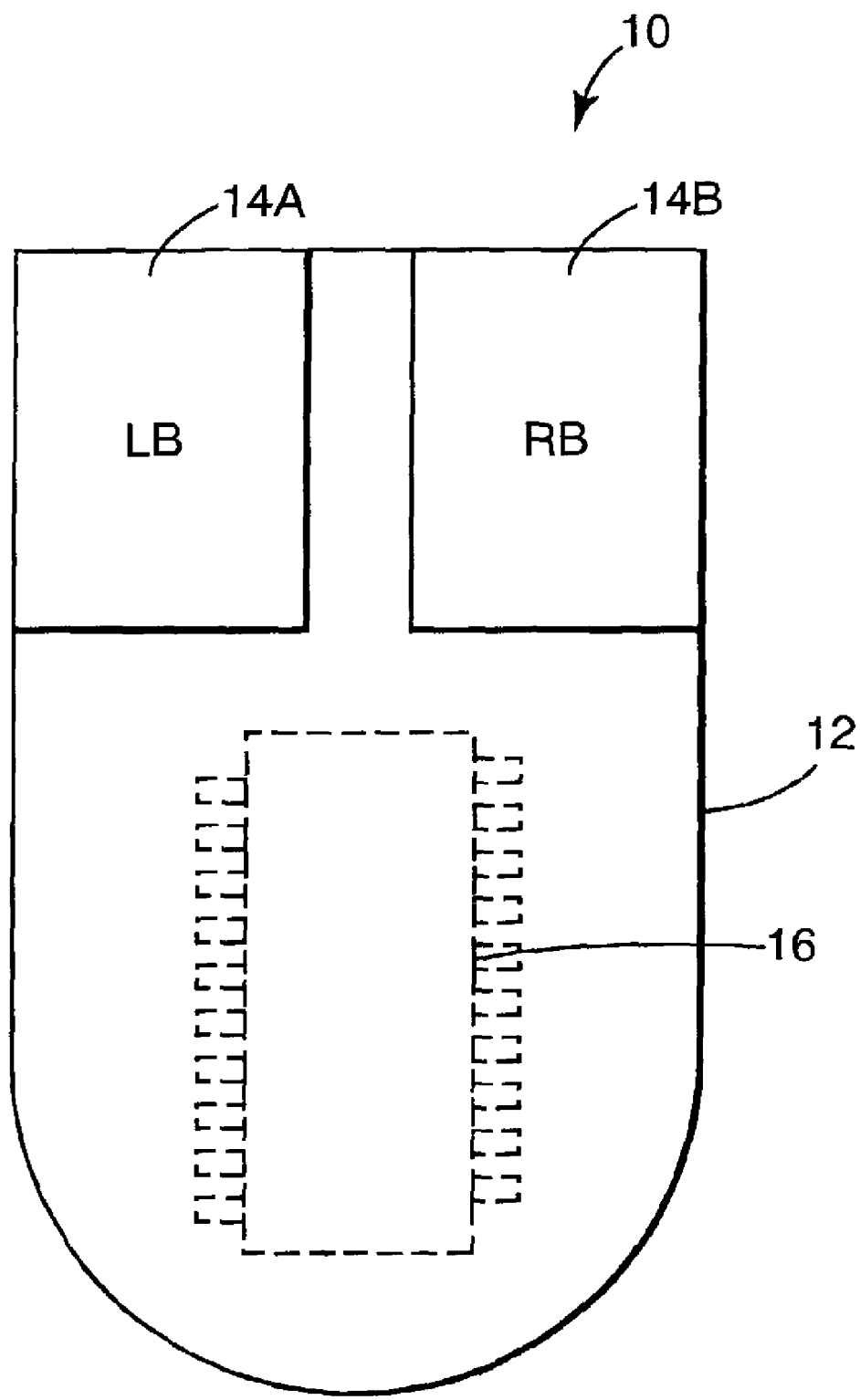
FIG. 1 is a top view of an optical mouse according to one embodiment of the present invention.

FIG. 1 is a top view of an optical mouse 10 according to one embodiment of the present invention. Mouse 10 includes plastic case 12, left mouse button (LB) 14A, right mouse button (RB) 14B, and optical motion sensor chip 16. Sensor chip 16 is covered by plastic case 12, and is therefore shown with dashed lines in FIG. 1.

Figure 2:
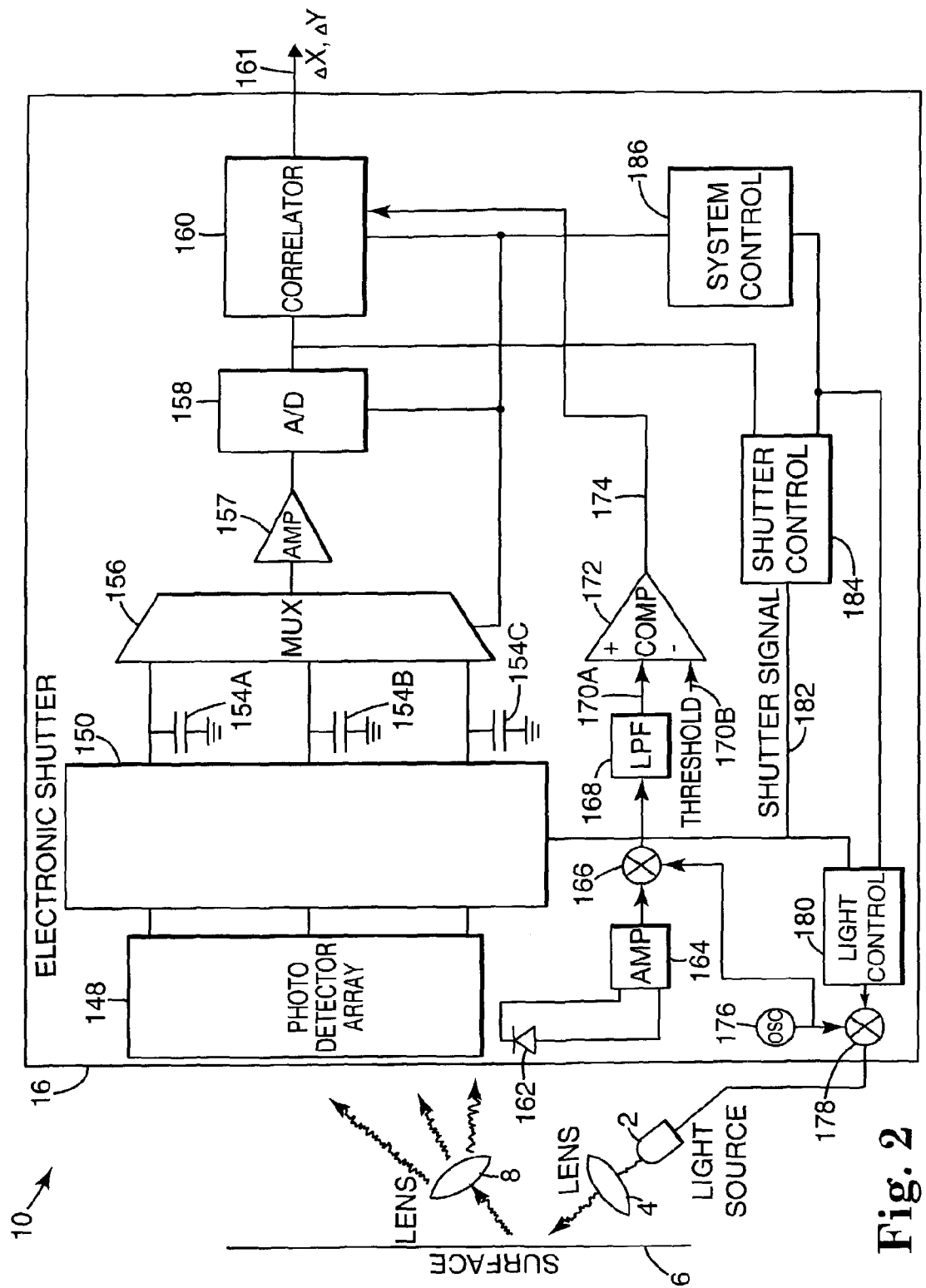
FIG. 2 is a block diagram illustrating major components of the optical mouse shown in FIG. 1 according to one embodiment of the present invention.

FIG. 2 is a block diagram illustrating major components of optical mouse 10 according to one embodiment of the present invention. Optical mouse 10 includes light source 2, lenses 4 and 8, and optical motion sensor 16. Optical motion sensor 16 includes photo detector array 148, electronic shutter 150, a plurality of sense capacitors 154A-154C (collectively referred to as sense capacitors 154), multiplexer 156, amplifier 157, analog to digital (A/D) converter 158, correlator 160, photo detector 162, amplifier 164, multiplier 166, low pass filter (LPF) 168, comparator (COMP) 172, oscillator (OSC) 176, multiplier 178, light controller 180, shutter controller 184, and system controller 186.

In one embodiment, the operation of optical motion sensor 16 is primarily controlled by system controller 186, which is coupled to and controls multiplexer 156, A/D converter 158, correlator 160, shutter controller 184, and light controller 180. In operation, according to one embodiment, light source 2 emits light that is directed by lens 4 onto surface 6, which is a desktop or other suitable imaging surface, and reflected images are generated. In one embodiment, light source 2 includes one or more light emitting diodes (LED's). Reflected light from surface 6 is directed by lens 8 onto photo detector array 148 and photo detector 162. Photo detector 162 and photo detectors in photo detector array 148 each provide a signal that varies in magnitude based upon the intensity of light incident on the photo detector. In one embodiment, photo detector 162 and the photo detectors in photo detector array 148 are photo diodes.

Electronic shutter 150 is controlled by a shutter signal 182 from shutter controller 184. When electronic shutter 150 is "open," charge accumulates on sense capacitors 154, creating voltages that are related to the intensity of light incident on the photo detectors in array 148. When electronic shutter 150 is "closed," no further charge accumulates or is lost from sense capacitors 154. Multiplexer 156 connects each sense capacitor 154 in turn to amplifier 157 and A/D converter 158, to amplify and convert the voltage from each sense capacitor 154 to a digital value. Sense capacitors 154 are then discharged through electronic shutter 150, so that the charging process can be repeated.

In one embodiment, light source 2 is controlled by shutter signal 182 from shutter controller 184. When shutter signal 182 goes high, the high signal causes light controller 180 to output a signal for turning on light source 2. The high shutter signal 182 also causes electronic shutter 150 to open, thereby allowing charge to accumulate on sense capacitors 154. When shutter signal 182 goes low, the low signal causes electronic shutter 150 to close, and causes light controller 180 to output a low signal to turn off light source 2. In one form of the invention, the signals output by light controller 180 are modulated by oscillator 176 and multiplier 178, thereby causing the light emitted by light source 2 to be modulated in the same manner. The modulation of light emitted by light source 2 is described in further detail below.

Based on the level of voltage from each sense capacitor 154, A/D converter 158 generates a digital value of a suitable resolution (e.g., one to eight bits) indicative of the level of voltage. The digital values represent a digital image or digital representation of the portion of the desktop or other imaging surface under optical mouse 10. The digital values are stored as frames within correlator 160.

In addition to providing digital images to correlator 160, A/D converter 158 also outputs digital image data to shutter controller 184 in one form of the invention. Shutter controller 184 helps to ensure that successive images have a similar exposure, and helps to prevent the digital values from becoming saturated to one value. Shutter controller 184 checks the values of digital image data and determines whether there are too many minimum values or too many maximum values. In one embodiment, if there are too many minimum values, controller 184 increases the charge accumulation time of electronic shutter 150, and if there are too many maximum values, controller 184 decreases the charge accumulation time of electronic shutter 150.

The overall size of photo detector array 148 is preferably large enough to receive an image having several features. Images of such spatial features produce translated patterns of pixel information as optical mouse 10 moves over a surface. The number of photo detectors in array 148 and the frame rate at which their contents are captured and digitized cooperate to influence how fast optical mouse 10 can be moved across a surface and still be tracked. Tracking is accomplished by correlator 160 by comparing a newly captured sample frame with a previously captured reference frame to ascertain the direction and amount of movement.

In one embodiment, the entire content of one of the frames is shifted by correlator 160 by a distance of one pixel successively in each of the eight directions allowed by a one pixel offset trial shift (one over, one over and one down, one down, one up, one up and one over, one over in the other direction, etc.). That adds up to eight trials. Also, since there might not have been any motion, a ninth trial "null shift" is also used. After each trial shift, those portions of the frames that overlap each other are subtracted by correlator 160 on a pixel by pixel basis, and the resulting differences are preferably squared and then summed to form a measure of similarity (correlation) within that region of overlap. In another embodiment, larger trial shifts (e.g., two over and one down) may be used. The trial shift with the least difference (greatest correlation) can be taken as an indication of the motion between the two frames. That is, it provides raw movement information that may be scaled and or accumulated to provide movement information ($\Delta X$ and $\Delta Y$) 161 of a convenient granularity and at a suitable rate of information exchange, which is output to a host device.

In one embodiment, sensor 16 is configured to distinguish between ambient light and light from light source 2, and detect when optical mouse 10 is lifted away from surface 6 by sensing the level of light from light source 2 that is reflected from surface 6. When optical mouse 10 is lifted away from surface 6, the light from light source 2 no longer reaches photo detector 162 and the photo detectors in array 148 in the same quantity that it did previously, if at all; the reflecting surface 6 is too far away or is simply not in view. However, when mouse 10 is lifted, ambient light from other light sources (e.g., fluorescent lights, a cathode ray tube (CRT), sunlight, etc.) may strike the photo detectors, and the outputs of the photo detectors will vary based on the intensity of the ambient light.

In one embodiment, sensor 16 modulates the light from light source 2 at a frequency that is unlikely to occur in ambient light from other light sources that may be present near the mouse 10, which allows sensor 16 to distinguish between light received from light source 2 and light received from ambient light sources. When the strength of the reflected modulated light from light source 2 falls below a predetermined threshold value, indicating that mouse 10 has likely been lifted from surface 6, sensor 16 reports zero motion to the host device so that the screen pointer is held steady.

Ambient light that may cause interference with the operation of mouse 10 is typically at a low frequency, such as less than 200 Hertz (Hz). CRT's and fluorescent lights are typically the most problematic. CRT's typically flash at up to about 100 Hz, and fluorescent lights in the United States typically flash at 120 Hz. In one embodiment, light source 2 is modulated to provide light flashes or light pulses at a substantially higher frequency than such ambient light sources.

Light source 2 turns on when it receives a pulse from sensor 16. The amount of time that light source 2 remains on is determined by the width (duration) of the received pulse. In previous optical mice, when the mouse was being moved, 1500 images per second were typically captured, with the light source being flashed once for each captured image (i.e., a flash rate of 1500 flashes per second), and with a typical flash duration between about ten and one hundred microseconds for each flash. In one embodiment of the present invention, rather than turning on the light source 2 with a single, relatively wide pulse of the desired duration (e.g., one hundred microseconds) to capture an image, a high frequency digital modulation is used to modulate a wide pulse, and thereby generate many pulses having a smaller width that provide the same effective illumination as a single wide pulse.

In one embodiment, light controller 180 outputs a pulse to multiplier (modulator) 178 during each frame period that an image is to be captured. In one form of the invention, the pulses output by light controller 180 have a width of twice the desired duration of on time of light source 2 for a particular image to be captured. In one embodiment, oscillator 176 generates a 100 KHz square wave, which is output to multiplier 178 and multiplier 166. In other embodiments, frequencies other than 100 KHz are used for the modulation waveform output by oscillator 176. Multiplier 178 multiplies the pulse received from light controller 180 by the square wave received from oscillator 176, and outputs the resulting modulated signal to light source 2.

For example, if a one hundred microsecond duration of on time of light source 2 is desired for each image to be captured, rather than driving light source 2 with a single pulse having a width of one hundred microseconds, in one form of the invention, light controller 180 outputs a pulse having a width of two hundred microseconds to multiplier 178. Multiplier 178 multiplies the received pulse by the 100 KHz square wave received from oscillator 176, resulting in a modulated signal that drives light source 2. The modulated signal includes twenty cycles of a 100 KHz square wave, with a total duration of two hundred microseconds and a cumulative on time of one hundred microseconds. The photo detector array 148 integrates the same amount of signal in each frame for the multiple narrower pulses as for a single wider pulse, and delivers identical images to those that would be delivered using a single wider pulse.

In one embodiment, a synchronous detection technique is used to detect the modulated light signal output by light source 2 and reflected by surface 6. In one form of the invention, a photo detector 162 separate from the photo detector array 148 is used to synchronously detect the modulated light from light source 2 in a continuous time manner. The electrical signal output by photo detector 162 is amplified by amplifier 164. In one embodiment, amplifier 164 is AC coupled to photo detector 162, and clips for large signals in order to cover a large dynamic range. Multiplier (demodulator) 166 multiplies the amplified signal from amplifier 164 by the modulation waveform (e.g., 100 KHz square wave) output by oscillator 176.

In one form of the invention, multiplier 166 alternately multiplies by +1 then −1, so that the AC signals at the 100 KHz modulation frequency (i.e., the signals generated from light received from light source 2) output by amplifier 164 are synchronously rectified (i.e., demodulated down to a DC or low frequency signal), resulting in a demodulated signal that is passed through low pass filter 168 to comparator 172. For signals output by photo detector 162 that are at frequencies different than the modulation frequency (i.e., signals generated from light received from ambient light sources), these signals are typically DC or low frequency signals (e.g., 60 or 120 Hz) that are converted to high frequency signals when multiplied by the alternating +1 and −100 KHz square wave by multiplier 166. The high frequency signals output by multiplier 166 are blocked by low pass filter 168, so the output of low pass filter 168 will be near zero for such signals. Thus, photo detector 162 is essentially gated at the same frequency that the light source 2 is being flashed, so that ambient light is blocked, and the magnitude of light from light source 2 can be detected.

Comparator 172 includes a first input 170A coupled to the output of low pass filter 168, and a second input 170B coupled to a threshold voltage. Comparator 172 compares the signal received from low pass filter 168 with the threshold value, and thereby determines whether there is a sufficient amount of light from light source 2 reaching the photo detectors 148. If the signal received from low pass filter 168 falls below the threshold value, indicating that there is an insufficient amount of light from light source 2 reaching the photo detectors 148, and that mouse 10 has likely been lifted away from surface 6, comparator 172 outputs a low signal indication or "mouse lifted" signal 174 to correlator 160.

Components of the electrical signal generated by photo detector 162 based on ambient light are filtered out, and do affect the signal output to the comparator 172, even though the ambient light does affect the output of the photo detector array 148. In cases where photo detector array 148 generates poor (e.g., out of focus) images because of excessive ambient light, and very little light from light source 2 strikes the photo detector array 148, the separate path, including photo detector 162, amplifier 164, multiplier 166, low pass filter 168, and comparator 172, detects the problem, and comparator 172 outputs a mouse lifted signal 174 to correlator 160.

In one embodiment, when correlator 160 receives a mouse lifted signal 174, correlator 160 suppresses normal motion calculations from the captured images and stops reporting motion data 161 or reports zero motion, resulting in a freeze in the screen pointer position at whatever location it currently occupies, when it otherwise might jitter randomly on the screen. When optical mouse 10 is subsequently replaced on surface 6, comparator 172 detects that the signal received from low pass filter 168 exceeds the threshold value, comparator 172 suppresses the mouse lifted signal 174, and correlator 160 resumes generating movement data 161 from captured images in the normal manner.

In another embodiment, rather than using a multiplier 166 to demodulate the modulated light signal from light source 2 down to a low frequency, an AC tuned filter and envelope detection circuitry may be used to convert the signal back to a DC or low-frequency indication of the strength of the received signal from light source 2.

For the embodiment shown in FIG. 2, a photo detector 162 separate from photo detector array 148 is used to detect the level of reflected modulated light from light source 2. In the embodiments illustrated in FIGS. 3A and 4A, the photo detector array 148 itself is used in detecting the magnitude of reflected modulated light from light source 2.

Figure 3A:
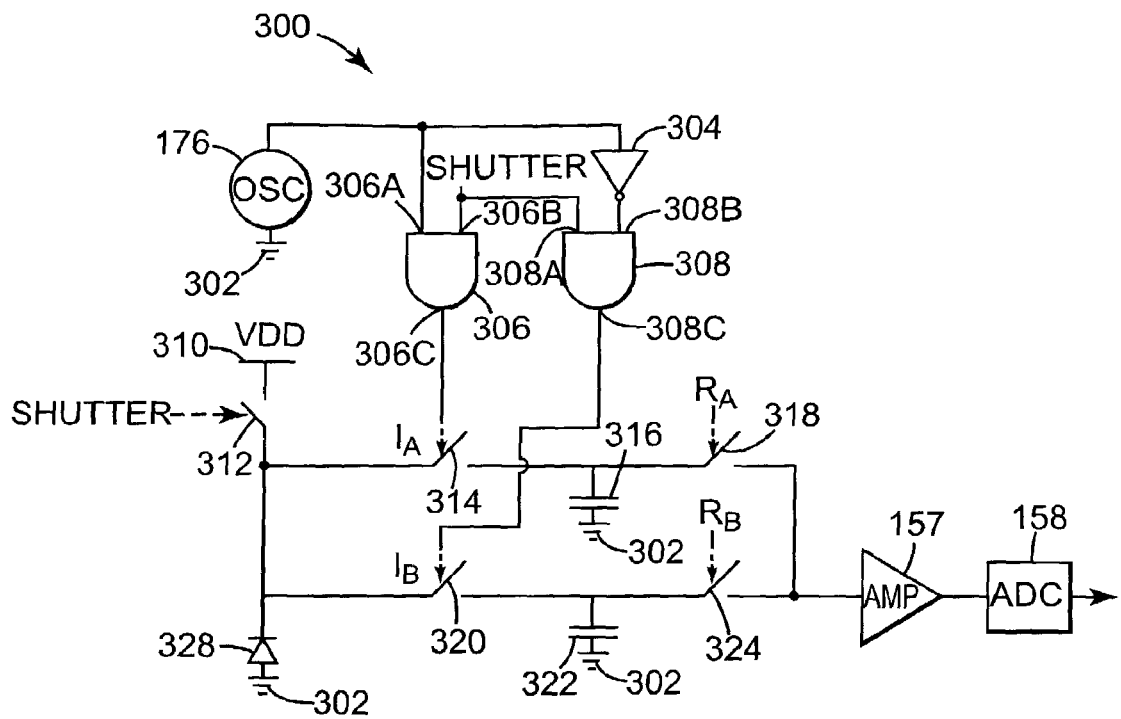
FIG. 3A is an electrical schematic/block diagram illustrating light sensing circuitry of the optical mouse shown in FIG. 1 with two capacitors per photo detector according to one embodiment of the present invention.

FIG. 3A is an electrical schematic/block diagram illustrating light sensing circuitry 300 of optical mouse 10 with two capacitors per pixel or photo detector in array 148 according to one embodiment of the present invention. A single pixel circuit of array 148 is illustrated in FIG. 3A. It will be understood by persons of ordinary skill in the art that in a complete array 148, portions of the illustrated circuitry 300 will be replicated a number of times based on the number of pixels in array 148.

Light sensing circuitry 300 includes oscillator 176, inverter 304, AND gates 306 and 308, switch 312, switch 314, capacitor 316, switch 318, switch 320, capacitor 322, switch 324, and photodiode 328. In one embodiment, oscillator 176 generates a square wave, which is output to inverter 304 and to AND gate 306. AND gate 306 includes inputs 306A and 306B, and output 306C. AND gate 306 receives the square wave from oscillator 176 at input 306A. AND gate 308 includes inputs 308A and 308B, and output 308C. Inverter 304 inverts the square wave received from oscillator 176, and outputs an inverted square wave to input 308B of AND gate 308. Input 306B of AND gate 306 and input 308A of AND gate 308 are coupled to shutter controller 184 (shown in FIG. 2), which outputs shutter signal 182.

Switch 314 is controlled by the output 306C of AND gate 306. Switch 320 is controlled by the output 308C of AND gate 308. When shutter signal 182 is low, the outputs of AND gates 306 and 308 are low, and switches 314 and 320 are open. When shutter signal 182 is high, AND gate 306 outputs a square wave to switch 314, and AND gate 308 outputs a phase-shifted square wave to switch 320. Because of the signal inversion caused by inverter 304, the square wave output by AND gate 308 is phase shifted by 180 degrees with respect to the square wave output by AND gate 306. When the square wave output by AND gate 306 is high, switch 314 is closed, and when this square wave is low, switch 314 is open. Similarly, when the square wave output by AND gate 308 is high, switch 320 is closed, and when this square wave is low, switch 320 is open.

Switch 312 is controlled by the shutter signal 182 output by shutter controller 184. When shutter signal 182 is high, switch 312 is closed. And when shutter signal 182 is low, switch 312 is open. Light sensing circuitry 300 is described in further detail below with reference to FIG. 3B.

Figure 3B:
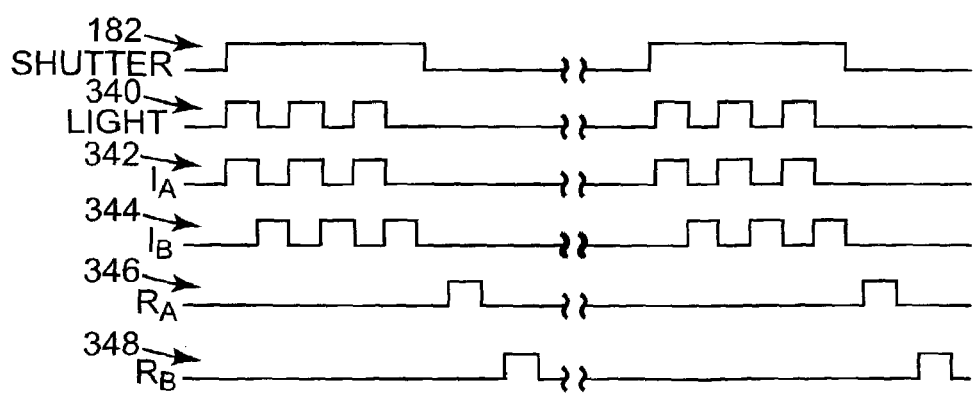
FIG. 3B is a timing diagram illustrating the timing of control signals for the light sensing circuitry shown in FIG. 3A.

FIG. 3B is a timing diagram illustrating the timing of control signals for the light sensing circuitry 300 shown in FIG. 3A. Shutter signal 182 includes a series of pulses that are generated by shutter controller 184 (shown in FIG. 2). When shutter signal 182 is high, light source 2 is flashed on and off at a frequency determined by the frequency of oscillator 176. The signal from light source 2 is represented by light source signal 340 in FIG. 3B, with a high value corresponding to the light source 2 being on, and a low value corresponding to the light source 2 being off. The output of AND gate 306 is represented by $I_A$ signal 342, which is a square wave with the same phase and frequency as light source signal 340 when shutter signal 182 is high, and is low when shutter signal 182 is low. The output of AND gate 308 is represented by $I_B$ signal 344, which is a square wave with the same frequency as light source signal 340 (and $I_A$ signal 342) when shutter signal 182 is high, and is low when shutter signal 182 is low. As shown in FIG. 3B, $I_B$ signal 344 is 180 degrees out of phase with signals 340 and 342.

Although three pulses are shown for signals 340, 342, and 344 while shutter signal 182 is high, the number of pulses during this period will depend on the pulse width of the shutter signal 182, and the frequency of oscillator 176. For example, assuming that a shutter signal 182 with a pulse width of one hundred microseconds is generated for each image to be captured, and that the light source 2 is modulated with a 100 KHz square wave, then ten pulses of light five microseconds wide with five microsecond gaps between each pulse occur during each shutter opening. For this example, signals 340, 342, and 344 would include ten pulses with a five microsecond duration and a five microsecond low period between each pulse.

In one form of the invention, each pixel circuit in photo detector array 148 includes two storage capacitors 316 and 322. In one embodiment, the light received by each pixel during the light source 2 on times generates charge that is accumulated on the pixel's capacitor 316, while the light received by each pixel during the light source 2 off times generates charge that is accumulated on the pixel's capacitor 322. More specifically, when shutter signal 182 goes high, switch 312 closes, thereby connecting photo diode 328 between power supply (VDD) 310 and ground 302. When shutter signal 182 is high, and $I_A$ signal 342 goes high, switch 314 closes (switch 320 is open since $I_B$ signal 344 is low when $I_A$ signal 342 is high), thereby allowing the photo current from photodiode 328 to charge capacitor 316. When shutter signal 182 is high, and $I_B$ signal 344 goes high, switch 320 closes (switch 314 is open since $I_A$ signal 342 is low when $I_B$ signal 344 is high), thereby allowing the photo current from photodiode 328 to charge capacitor 320.

Switches 318 and 324 are controlled by $R_A$ signal 346 and $R_B$ signal 348, respectively. When $R_A$ signal 346 is high, switch 318 is closed. And when $R_A$ signal 346 is low, switch 318 is open. When $R_B$ signal 348 is high, switch 324 is closed. And when $R_B$ signal 348 is low, switch 324 is open. At some point after the end of the shutter time (i.e., after shutter signal 182 goes low), $R_A$ signal 346 goes high, closing switch 318, and connecting capacitor 316 to amplifier 157. The voltage on capacitor 316 is amplified by amplifier 157 and converted to a digital value by analog-to-digital converter 158. At some point after $R_A$ signal 346 goes low, $R_B$ signal 348 goes high, closing switch 324, and connecting capacitor 322 to amplifier 157. The voltage on capacitor 322 is amplified by amplifier 157 and converted to a digital value by analog-to-digital converter 158. Analog-to-digital converter 158 outputs the digital values to correlator 160 (shown in FIG. 2).

In one embodiment, each of the pixels in array 148 include two capacitors 316 and 322 and generate two voltages in the same manner as described above with reference to FIGS. 3A and 3B. The light received by array 148 during the light source 2 on times generates charge that is accumulated on the first capacitor 316, while the light received by array 148 during the light source 2 off times generates charge that is accumulated on the second capacitor 322. Ambient light contributes to the accumulated charge during both on times and off times of light source 2. For each image acquired by array 148, each pixel in the array 148 outputs two voltages—a first voltage (from capacitor 322) representing the sensed amount of ambient light, and a second voltage representing the combined amount of sensed ambient light and sensed light from light source 2. The two voltages output by each pixel are converted to corresponding first and second digital values by analog-to-digital converter 158, which are provided to correlator 160. In one embodiment, correlator 160 determines the amount of light incident on array 148 from light source 2 by subtracting the first value representing the amount of ambient light from the second value representing the combined amount of ambient light and light from light source 2.

The values obtained by subtracting the first value representing the amount of ambient light from the second value representing the combined amount of ambient light and light from light source 2 are referred to herein as a filtered digital image, since the ambient light has essentially been filtered out. In one embodiment, correlator 160 correlates these filtered digital images to generate movement information 161. If there is a lot of ambient light on the area under the mouse 10 that is being imaged, this ambient light can interfere with navigation accuracy during normal use of the mouse 10. By filtering out the ambient light from the captured images, better navigation accuracy is provided.

In one embodiment, if the level of light from light source 2 calculated by correlator 160 falls below a given threshold value, indicating that there is an insufficient amount of light from light source 2 reaching the photo detectors 148, and that mouse 10 has likely been lifted away from surface 6, correlator 160 suppresses normal motion calculations from the captured images and stops reporting motion data 161 or reports zero motion, resulting in a freeze in the screen pointer position at whatever location it currently occupies.

Figure 4A:
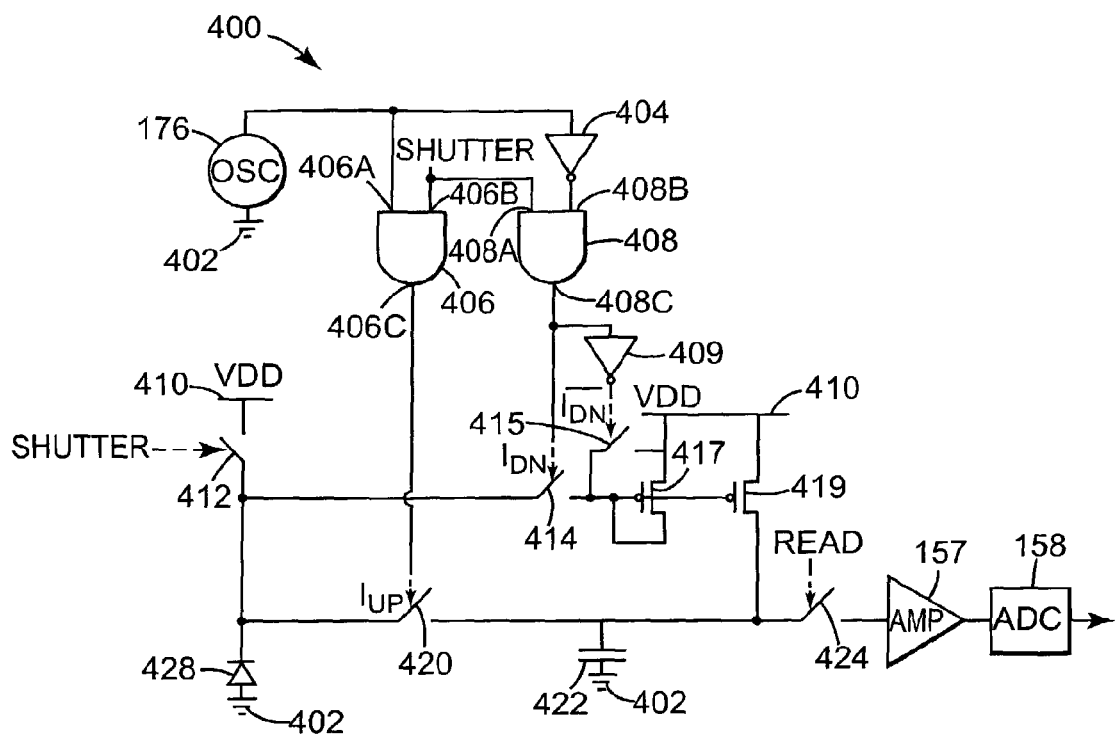
FIG. 4A is an electrical schematic/block diagram illustrating light sensing circuitry of the optical mouse shown in FIG. 1 with one capacitor per photo detector according to another embodiment of the present invention.

FIG. 4A is an electrical schematic/block diagram illustrating light sensing circuitry 400 of optical mouse 10 with one capacitor per pixel or photo detector in array 148 according to another embodiment of the present invention. A single pixel circuit of array 148 is illustrated in FIG. 4A. It will be understood by persons of ordinary skill in the art that in the complete array 148, portions of the illustrated circuitry 400 will be replicated a number of times based on the number of pixels in array 148.

Light sensing circuitry 400 includes oscillator 176, inverter 404, AND gates 406 and 408, inverter 409, switches 412, 414, 415, 420, and 424, transistors 417 and 419, capacitor 422, and photo detector 428. In one embodiment, transistors 417 and 419 are P-type Metal Oxide Semiconductor (PMOS) Field Effect Transistors (FET's). In one embodiment, oscillator 176 generates a square wave, which is output to inverter 404 and to AND gate 406. AND gate 406 includes inputs 406A and 406B, and output 406C. AND gate 406 receives the square wave from oscillator 176 at input 406A. AND gate 408 includes inputs 408A and 408B, and output 408C. Inverter 404 inverts the square wave received from oscillator 176, and outputs an inverted square wave to input 408B of AND gate 408. Input 406B of AND gate 406 and input 408A of AND gate 408 are coupled to shutter controller 184 (shown in FIG. 2), which outputs shutter signal 182.

Switch 414 is controlled by the output 408C of AND gate 408. Switch 415 is controlled by the output 408C of AND gate 408 after being inverted by inverter 409. Switch 420 is controlled by the output 406C of AND gate 406. When shutter signal 182 is low, the outputs of AND gates 406 and 408 are low, switches 414 and 420 are open, and switch 415 is closed. When shutter signal 182 is high, AND gate 406 outputs a square wave to switch 420, and AND gate 408 outputs a phase-shifted square wave to switch 414. Because of the signal inversion caused by inverter 404, the square wave output by AND gate 408 is phase shifted by 180 degrees with respect to the square wave output by AND gate 406. When the square wave output by AND gate 406 is high, switch 420 is closed, and when this square wave is low, switch 420 is open. When the square wave output by AND gate 408 is high, switch 414 is closed, and when this square wave is low, switch 414 is open. Inverter 409 inverts the square wave output by AND gate 408, so when the square wave output by AND gate 408 is high, switch 415 is open, and when this square wave is low, switch 415 is closed.

Switch 412 is controlled by the shutter signal 182 output by shutter controller 184. When shutter signal 182 is high, switch 412 is closed. And when shutter signal 182 is low, switch 412 is open. Light sensing circuitry 400 is described in further detail below with reference to FIG. 4B.

Figure 4B:
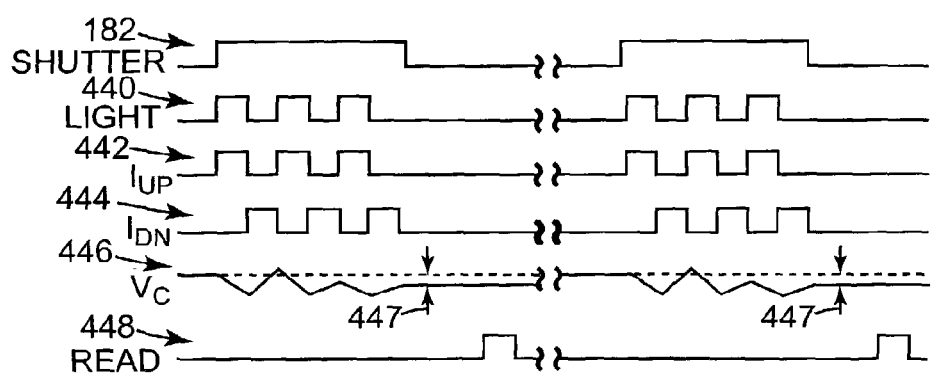
FIG. 4B is a timing diagram illustrating the timing of control signals for the light sensing circuitry shown in FIG. 4A.

FIG. 4B is a timing diagram illustrating the timing of control signals for the light sensing circuitry 400 shown in FIG. 4A. Shutter signal 182 includes a series of pulses that are generated by shutter controller 184 (shown in FIG. 2). When shutter signal 182 is high, light source 2 is flashed on and off at a frequency determined by the frequency of oscillator 176. The signal from light source 2 is represented by light source signal 440 in FIG. 4B, with a high value corresponding to the light source 2 being on, and a low value corresponding to the light source 2 being off. The output of AND gate 406 is represented by $I_{UP}$ signal 442, which is a square wave with the same phase and frequency as light source signal 440 when shutter signal 182 is high, and is low when shutter signal 182 is low. The output of AND gate 408 is represented by $I_{DN}$ signal 444, which is a square wave with the same frequency as light source signal 440 (and $I_{UP}$ signal 442) when shutter signal 182 is high, and is low when shutter signal 182 is low. As shown in FIG. 4B, $I_{DN}$ signal 444 is 180 degrees out of phase with signals 440 and 442.

Although three pulses are shown for signals 440, 442, and 444 while shutter signal 182 is high, the number of pulses during this period will depend on the pulse width of the shutter signal 182, and the frequency of oscillator 176.

In one form of the invention, each pixel circuit in photo detector array 148 includes one storage capacitor 422. In one embodiment, the light received by each pixel during the light source 2 off times generates charge that is accumulated on capacitor 422, while the light received by each pixel during the light source 2 on times causes capacitor 422 to discharge. More specifically, when shutter signal 182 goes high, switch 412 closes, thereby connecting photo diode 428 between power supply (VDD) 410 and ground 402. When shutter signal 182 is high, and $I_{UP}$ signal 442 goes high, switch 420 closes (switch 414 is open since $I_{DN}$ signal 444 is low when $I_{UP}$ signal 442 is high, so transistors 417 and 419 are essentially removed from the circuit), thereby allowing the photo current from photodiode 428 to discharge capacitor 422. Thus, as shown by $V_C$ signal 446 in FIG. 4B, which represents the voltage on capacitor 422 over time, the voltage ramps down during the time that the light source 2 is on, with a slope that depends on the combined amount of ambient light and light from light source 2 incident on the array 148.

When shutter signal 182 is high, and $I_{DN}$ signal 444 goes high, switch 414 closes and switch 415 opens (switch 420 is open since $I_{UP}$ signal 442 is low when $I_{DN}$ signal 444 is high), thereby allowing the photo current from photo diode 428 to charge capacitor 422. Transistors 417 and 419 are in a current mirror configuration. The photo current from photodiode 428 is replicated by the current mirror, and flows down through transistor 419 to charge capacitor 422. Thus, as shown by $V_C$ signal 446, the voltage on capacitor 422 ramps up during the time that the light source 2 is off, and only ambient light is incident on the array 148. The slope of the ramp up depends on the amount of ambient light incident on the array 148. The difference between the starting voltage of capacitor 422 (when shutter signal 182 goes high) and the ending voltage of capacitor 422 (when shutter signal 182 goes low) is a voltage 447 that represents the amount of light from light source 2.

Switch 424 is controlled by Read signal 448. When Read signal 448 is high, switch 424 is closed. And when Read signal 448 is low, switch 424 is open. At some point after the end of the shutter time (i.e., after shutter signal 182 goes low), Read signal 448 goes high, closing switch 424, and connecting capacitor 422 to amplifier 157. The voltage on capacitor 422 is amplified by amplifier 157 and converted to a digital value by analog-to-digital converter 158. Analog-to-digital converter 158 outputs the digital values to correlator 160 (shown in FIG. 2).

In one embodiment, each of the pixels in array 148 includes one capacitor 422, and generates voltages in the same manner as described above with reference to FIGS. 4A and 4B. For each image acquired by array 148, each pixel in the array 148 outputs a voltage that, with reference to an initial voltage, represents the sensed amount of light from light source 2. The voltages output by each pixel are converted to digital values by analog-to-digital converter 158, which are provided to correlator 160. These digital values are referred to herein as a filtered digital image, since the ambient light has essentially been filtered out. In one embodiment, correlator 160 correlates these filtered digital images to generate movement information 161. By filtering out the ambient light from the captured images, better navigation accuracy is provided.

In one embodiment, if the level of light from light source 2 determined by correlator 160 falls below a given threshold value, indicating that there is an insufficient amount of light from light source 2 reaching the photo detectors 148, and that mouse 10 has likely been lifted away from surface 6, correlator 160 suppresses normal motion calculations from the captured images and stops reporting motion data 161 or reports zero motion, resulting in a freeze in the screen pointer position at whatever location it currently occupies.

The time that shutter signal 182 is high is referred to as a shutter interval. As shown in FIGS. 3B and 4B, the shutter interval has essentially been divided into three subintervals, with three light pulses during each shutter interval. Since ambient light (and light from light source 2) are not necessarily constant, there is a tradeoff in terms of how many subintervals to break up the shutter interval into. More (smaller) subintervals allow better interleaving (and balance) between the light source 2 on and light source 2 off phases. It also allows a bigger dynamic range for the embodiment shown in FIG. 4A since shorter subintervals of potentially large ambient signal are integrated. Less subintervals are simpler to implement and reduce charge injection noise.

In one embodiment, optical motion sensor 16 is configured to be implemented in an optical mouse for a desktop personal computer, workstation, portable computer, or other device. In another embodiment, optical motion sensor 16 may also be implemented in an optical trackball, an optical fingerprint sensing pointing device, or other pointing device.

It will be understood by a person of ordinary skill in the art that functions performed by optical motion sensor 16 may be implemented in hardware, software, firmware, or any combination thereof. The implementation may be via a microprocessor, programmable logic device, or state machine. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory (ROM), and random access memory.

One form of the present invention provides an optical mouse with a lift detection mechanism that is more reliable than prior techniques, and that correspondingly provides lower power consumption than prior optical mice. One form of the present invention provides an optical mouse that modulates the light from the mouse light source to facilitate detecting when the mouse is up in the air and the screen pointer should not be moving. Another form of the present invention provides an optical mouse that modulates the light from the mouse light source so that if there is ambient light mixed in with the light from the mouse light source, the mouse is able to reject the ambient light and prevent the ambient light from interfering with the normal operation of the mouse. Yet another embodiment of the invention provides an optical mouse that modulates the light from the mouse light source to detect when the mouse is lifted, as well as to be able to reject the ambient light during normal operation. In one form of the invention, a separate photo detector is used to detect when the mouse has been lifted. In another form of the invention, rather than using a separate photo detector, the photo detector array used for capturing images for generating movement information is also used in detecting the mouse lifted condition, as well as in rejecting ambient light.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. An imaging device, comprising:

a light source for illuminating an imaging surface;

an oscillator configured to generate a first waveform of a first frequency;

a light controller circuit configured to generate a light control pulse;

a first multiplier configured to receive the first waveform and the light control pulse and modulate therefrom, a drive signal for driving the light source;

a photodetector configured to receive reflected light from the imaging surface and generate therefrom, a first output signal, wherein the first output signal comprises a first signal component corresponding to reflected light from the imaging surface, and a second signal component corresponding to ambient light received in the imaging device;

an amplifier configured to amplify the first output signal; and a circuit configured to remove the second signal component corresponding to ambient light, wherein the circuit comprises a second multiplier configured to demodulate the amplified first output signal with the first waveform.

2. The imaging device of claim 1, wherein the circuit configured to remove the second signal component corresponding to ambient light further comprising a low pass.

3. The imaging device of claim 2, wherein the imaging device is a computer mouse, the computer mouse further comprising:
   a photodetector array for capturing reflected light from the imaging surface and generating therefrom, pixel-level signal information; and
   a correlator circuit configured to receive the pixel-level signal information and to receive the first signal component corresponding to reflected light from the imaging surface, and generate therefrom, movement data indicative of motion of the computer mouse when placed upon the imaging surface.

4. The imaging device of claim 3, wherein the correlator circuit stops generation of movement data when the first signal component drops below a threshold level, the drop being indicative of a movement of the computer mouse away from the imaging surface.

5. The imaging device of claim 4, wherein the movement data is used to position a pointer on a display screen, and wherein the pointer is made motionless when the correlator circuit stops generation of movement data.

6. The imaging device of claim 1, wherein the first frequency is higher than 100 KHz.

7. An imaging device, comprising:
   an oscillator configured to generate a first waveform of a first frequency;
   a light source configured to illuminate an imaging surface, the light source being configured to illuminate in accordance with a drive signal modulated by the first waveform;
   a photodetector configured to receive reflected light from the imaging surface and generate therefrom a first output signal, wherein the first output signal comprises a first signal component corresponding to reflected light from the imaging surface, and a second signal component corresponding to ambient light received in the imaging device; and
   a circuit configured to remove the second signal component corresponding to ambient light, wherein the circuit is configured to demodulate the first output signal with the first waveform.

8. The imaging device of claim 7, wherein the imaging device forms a portion of a computer mouse, the computer mouse further comprising:
   a photodetector array configured to capture reflected light and generating pixel-level image information; and
   a correlator circuit configured to generate movement data indicative of motion of the computer mouse from the pixel-level image information.

9. The imaging device of claim 8, wherein the correlator circuit stops generation of movement data when the first signal component drops below a threshold level.

10. The imaging device of claim 9, wherein the movement data is used to position a pointer on a display screen, and wherein the pointer is made motionless when the correlator circuit stops generation of movement data.

11. The imaging device of claim 7, wherein the photodetector forms part of a photodetector array.

12. The imaging device of claim 7, wherein the first frequency is higher than 100 KHz.

13. The imaging device of claim 12, wherein the circuit configured to remove the second signal component corresponding to ambient light further comprises an AC tuned filter, and an envelope detection circuitry.

14. The imaging device of claim 7, wherein the circuit configured to remove the second signal component corresponding to ambient light further comprises a multiplier and a low pass filter.

15. An imaging device for controlling the position of a screen pointer, comprising:
   an oscillator configured to generate a first waveform of a first frequency;
   a light source configured to illuminate an imaging surface, the light source being configured to illuminate in accordance with a drive signal modulated by the first waveform;
   a photodetector array configured to capture reflected light and generate therefrom a first output signal comprising a first signal component corresponding to reflected light from the imaging surface and a second signal component corresponding to ambient light;
   a light sensing circuit configured to generate pixel-level image information from the first output signal, wherein the light sensing circuit comprises a switch capacitor circuit configured to remove the second signal component corresponding to ambient light by demodulating the first output signal with the first waveform; and
   a correlator circuit configured to generate movement data indicative of motion of the imaging device from pixel-level image information.

16. The imaging device of claim 15, wherein the switch capacitor circuit is configured to store electrical charges over a first capacitor when the light source is turned on and store electrical charges over a second capacitor when the light source is turned off.

17. The imaging device of claim 15, wherein the switch capacitor circuit is configured to charge a capacitor when the light source is in one of the "on" or "off" state and discharge the capacitor when the light source is in another of the "on" or "off".

18. The imaging device of claim 15, wherein the light sensing circuitry further comprises an analog to digital converter circuit.

19. The imaging device of claim 15, wherein the first frequency is higher than 100 KHz.

* * * * *